Jan. 10, 1967 A. TOMISEK 3,297,247

SLIDE RULE TYPE COMPUTER

Filed Oct. 24, 1965

6 Sheets-Sheet 1

INVENTOR

Adolph Tomisek

BY [signature]

ATTORNEY

Jan. 10, 1967 A. TOMISEK 3,297,247

SLIDE RULE TYPE COMPUTER

Filed Oct. 24, 1965

6 Sheets-Sheet 2

INVENTOR
Adolph Tomisek

BY

ATTORNEY

Jan. 10, 1967 A. TOMISEK 3,297,247

SLIDE RULE TYPE COMPUTER

Filed Oct. 24, 1965 6 Sheets-Sheet 3

INVENTOR
ADOLPH TOMISEK

BY Ayates Dowell & Ayates Dowell Jr
ATTORNEYS

Jan. 10, 1967 A. TOMISEK 3,297,247

SLIDE RULE TYPE COMPUTER

Filed Oct. 24, 1965 6 Sheets-Sheet 4

INVENTOR
ADOLPH TOMISEK

BY [signature]
ATTORNEYS

Jan. 10, 1967 A. TOMISEK 3,297,247

SLIDE RULE TYPE COMPUTER

Filed Oct. 24, 1965 6 Sheets-Sheet 5

INVENTOR
ADOLPH TOMISEK

BY A. Yates Dowell & A. Yates Dowell Jr.
ATTORNEYS

Jan. 10, 1967 A. TOMISEK 3,297,247

SLIDE RULE TYPE COMPUTER

Filed Oct. 24, 1965 6 Sheets-Sheet 6

INVENTOR
ADOLPH TOMISEK

BY A. Yates Dowell &
A. Yates Dowell, Jr.
ATTORNEYS

United States Patent Office 3,297,247
Patented Jan. 10, 1967

3,297,247
SLIDE RULE TYPE COMPUTER
Adolph Tomisek, Box 11, Montverde, Fla. 32756
Filed Oct. 24, 1965, Ser. No. 505,427
11 Claims. (Cl. 235—70)

Figure 1:
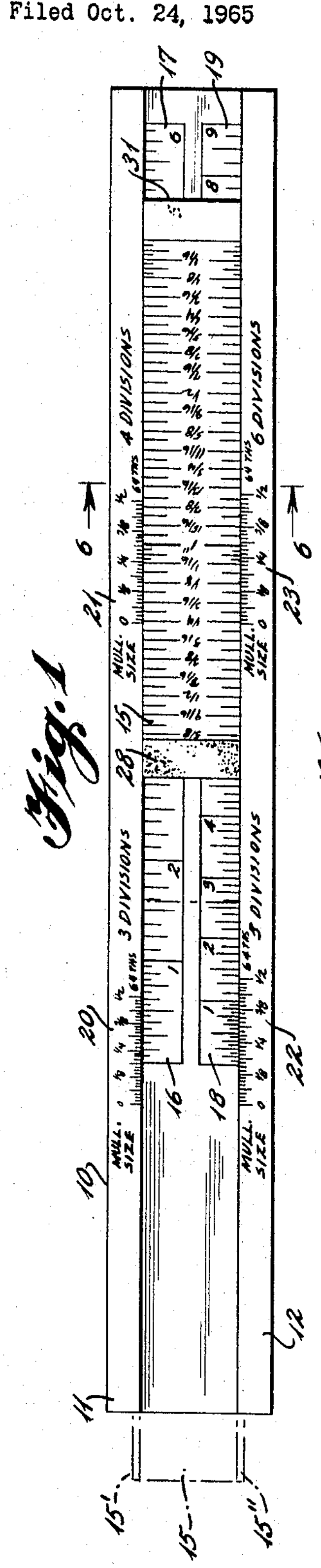

This invention relates generally to a slide rule for indicating the division products of the difference between a minuend number and one or more subtrahend numbers and is a continuation-in-part of my application Serial No. 383,675, filed July 20, 1964, now abandoned.

The invention relates particularly to a slide rule type computer for determining the size of a predetermined number of glass window panes with mullions therebetween to fit within an opening of a known dimension in the framing of a window. In one embodiment of the invention allowance may be made for the width of both the framing and the mullions of a window sash so that dimensions of glass panes needed to form a window to fit within a given size opening may be computed.

In the design of a window the computation of glass pane sizes for a window of a given overall dimension with framing of a given width and intervening mullions separating the individual glass panes is somewhat awkward, and requires great care. The computation is often performed in a shop where it is somewhat difficult to perform mathematical calculations on paper because of the lack of appropriate space and because of the interference of dirt, tools, etc. More than an elemenatry knowledge of mathematics is required because the answer will usually be found to contain a number of fractions, perhaps to the 64ths of an inch. Computation errors are quite likely to occur under such conditions and these may result in serious wastage of glass. Undersized glass cannot be used, and if below the range of standard minimum pane sizes would be completely wasted. Recutting oversize glass is time consuming, and increases the possibility of breakage.

Prior art slide rules are not particularly suitable for such computation. The ordinary slide rule designed for multiplication and division can only be used after the widths of window framing and mullions have been subtracted from the total window opening dimensions. Furthermore, such slide rules may not give results of a desired accuracy. For example, assume that the proper glass window pane should be 9¾ inches or 9.75 inches. A slide rule might give an answer anywhere between 9.73 and 9.77, as a result of inaccuracies in positioning the slide member and the difficulties in reading the results. Assuming that the answer was erroneously obtained as 9.77, glass cut to this size might be too big and would require recutting. It is accordingly very important that any tolerance be placed on the smaller side where it may be absorbed by putty.

Certain prior art slide rules were designed to facilitate this computation. However, these were subject to the objection of lack of accuracy as noted above. Calculation also was involved if framing width need be considered, as well as mullion width.

A major object of the invention is to simplify the calculation of glass pane sizes by providing a slide rule which can without need for a complex knowledge of mathematics perform this function.

A further object of the invention is to minimize glass wastage in cutting window panes.

A further object of one embodiment of this invention is to provide a slide rule which can compute glass pane size either by considering the total glass dimensions within the window frame, or can by considering the total window opening make an allowance for both the framing width and the mullion widths.

A further object of the invention is to provide a device by means of which division products can be obtained for the difference between minuend numbers and the total of a plurality of subtrahend numbers. This product can be read to a high degree of accuracy in either decimal fractions or ordinary fractions, and without the necessity of magnifying lenses or further computations.

Figure 2:
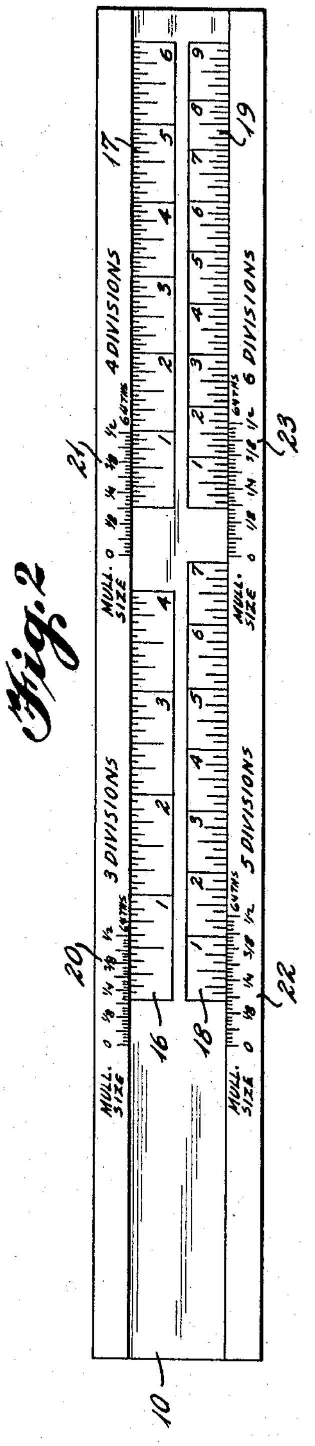
Figure 3:
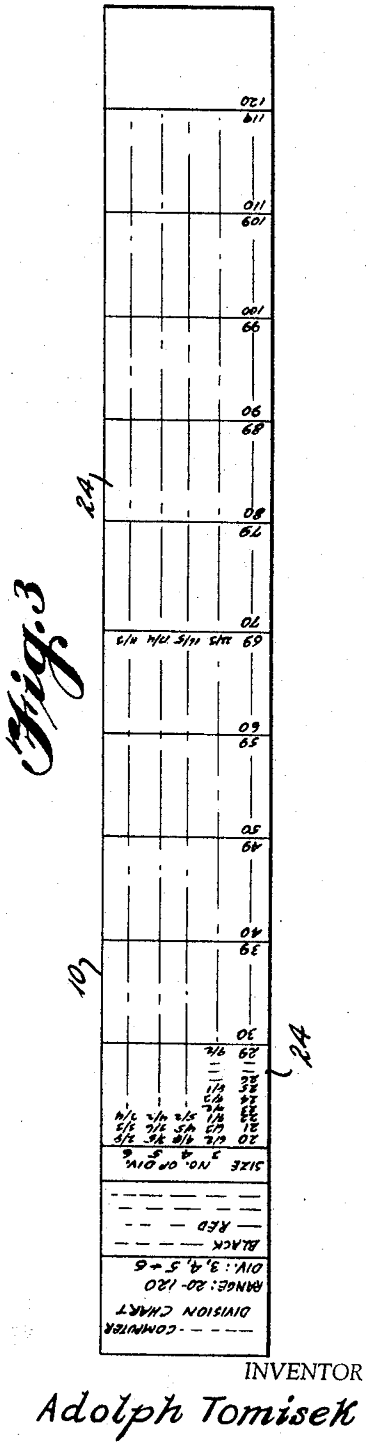
Figures 4, 5, 6, 7:
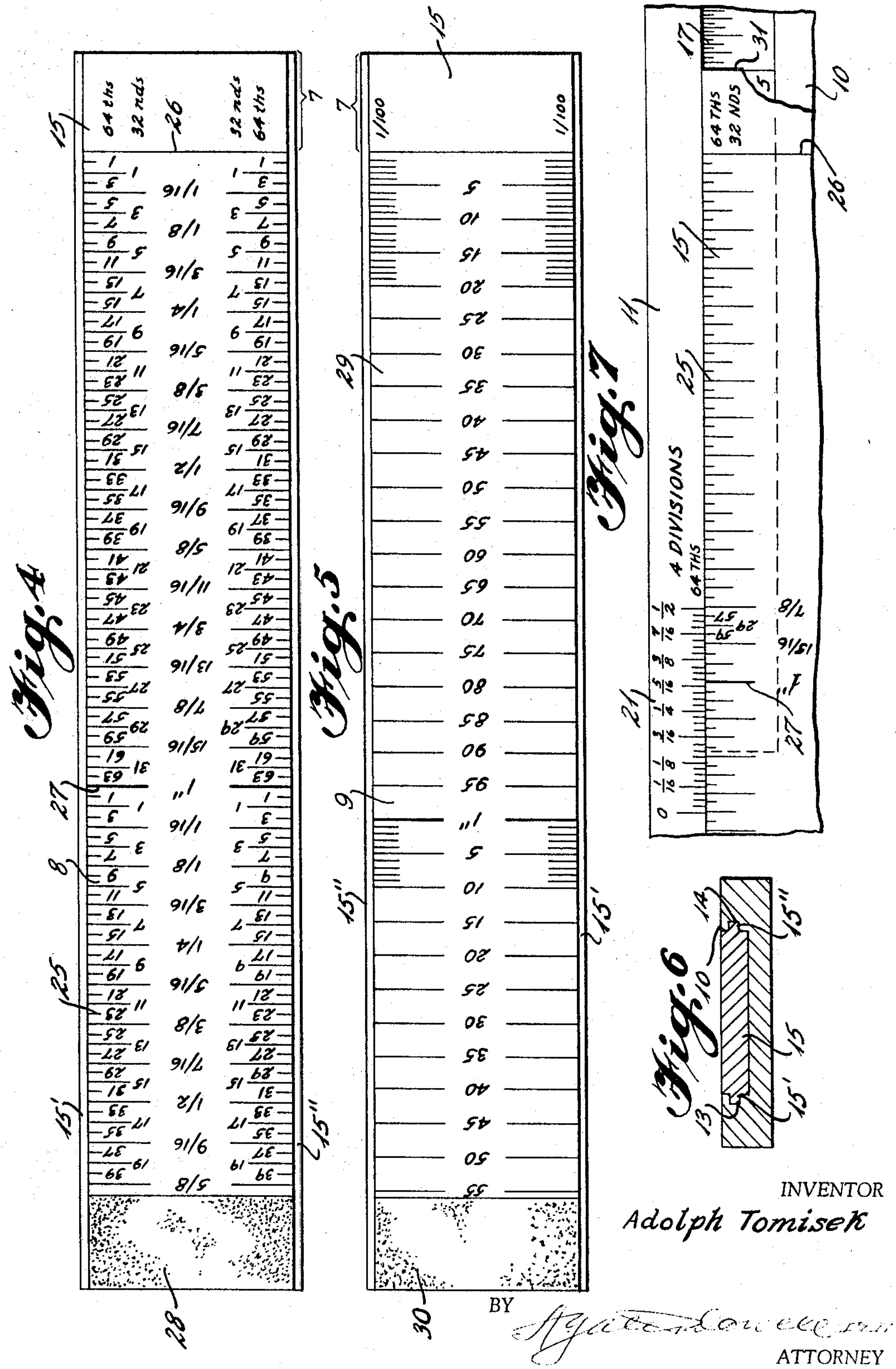
Figures 8, 9:
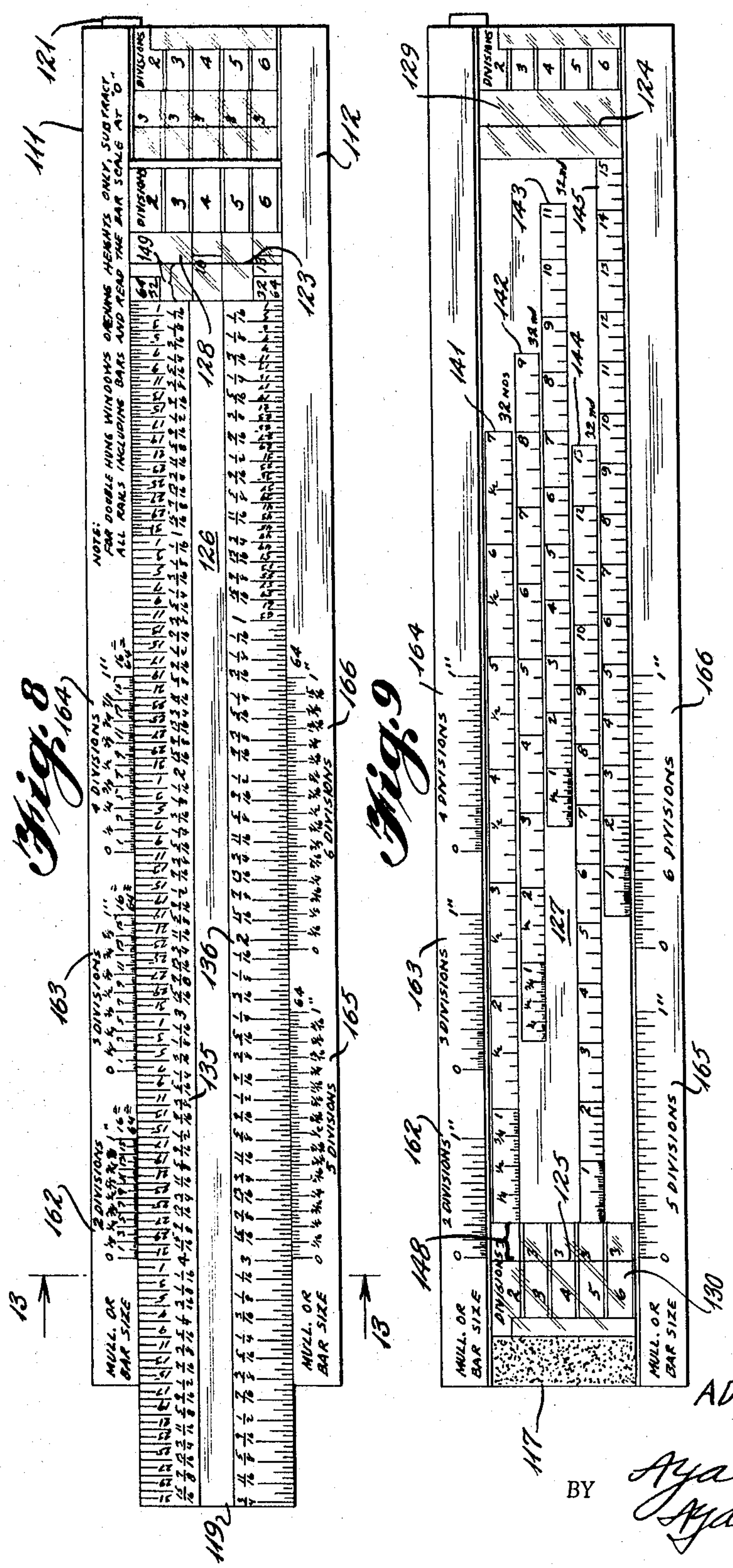
Figure 14:
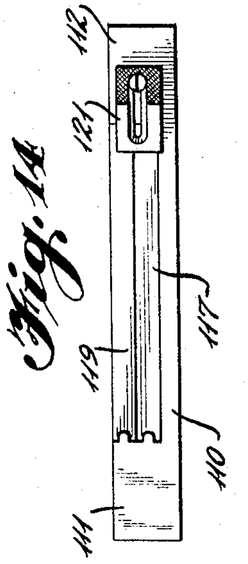
Figure 13:
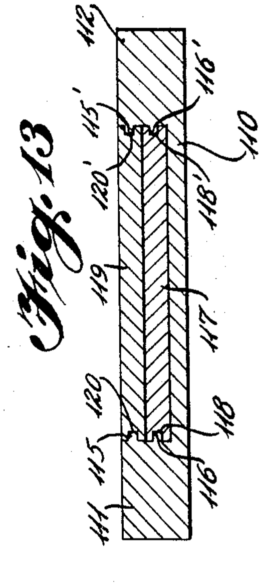
Figures 10, 11, 12:
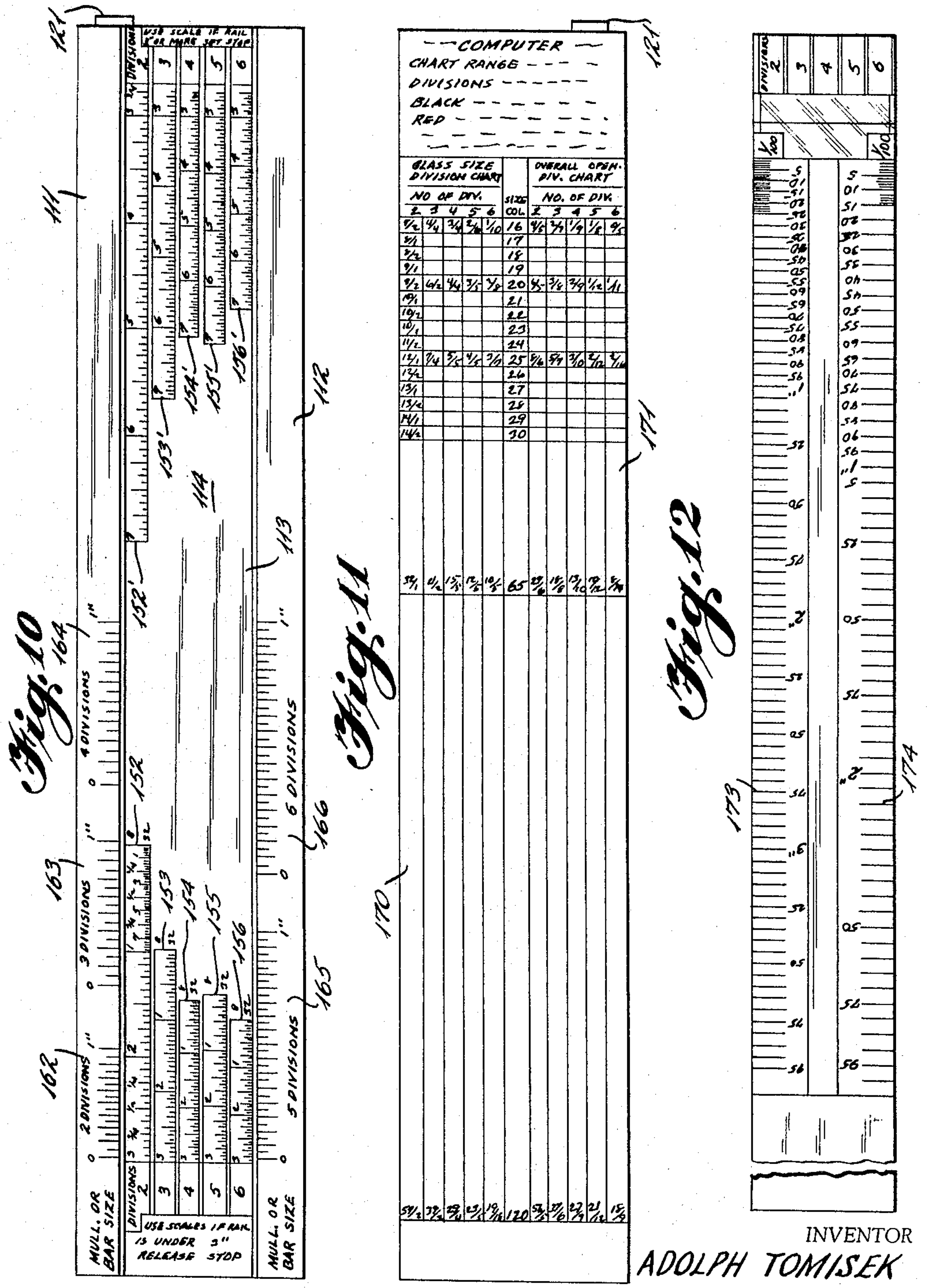

Other objects and advantages of the invention will be apparent from the following description taken in conjunction with the accompanying drawings in which:

FIG. 1 is a top plan view illustrating one application of the invention;

FIG. 2, a similar view with the inner or computer slide removed;

FIG. 3, a rear elevation illustrating the divisional chart;

FIG. 4, an enlarged top plan view of the inch fraction side of the inner slide;

FIG. 5, a similar view of the opposite or decimal side of the slide of FIG. 4;

FIG. 6, an enlarged transverse section through the computer on the line 6—6 of FIG. 1;

FIG. 7, an enlarged fragmentary plan view illustrating the use of the invention;

FIG. 8, a top plan view illustrating a different application of the invention;

FIG. 9, a similar view with the upper or division products slide removed;

FIG. 10, a similar view with both the upper division products scale and the lower or minuend scale removed;

FIG. 11, a rear elevation view showing the divisional chart of the slide rule of FIG. 8;

FIG. 12, a rear elevation of a portion of the opposite or decimal side of the upper slide of FIG. 8;

FIG. 13, a cross-sectional view on the line 13—13 of FIG. 8;

FIG. 14, an end view of the slide rule of FIG. 8; and

Figure 15:
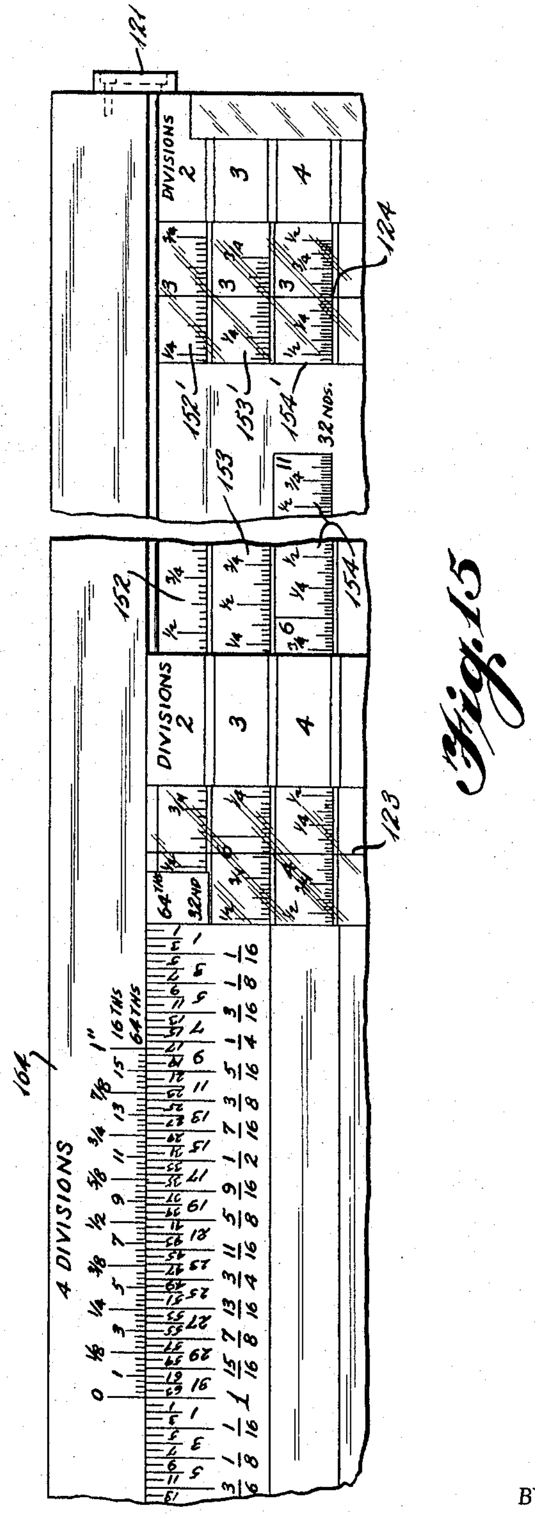
Figure 17:
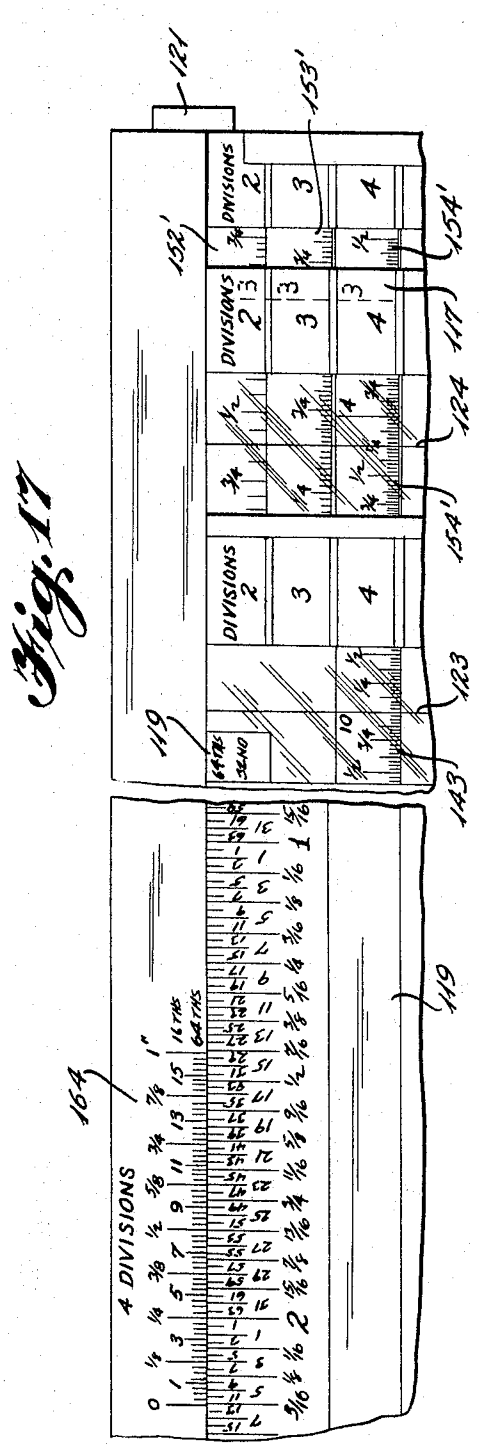
Figure 16:
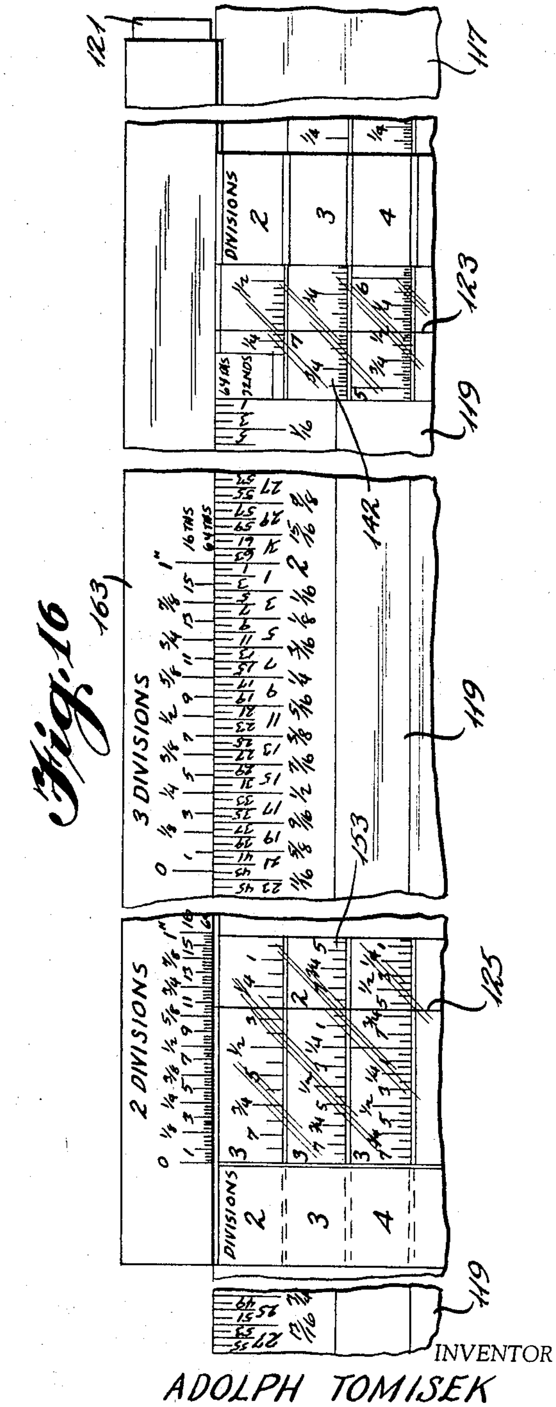

FIGS. 15, 16 and 17, enlarged fragmentary plan views illustrating the use of the slide rule of FIG. 8.

Briefly stated, this invention is a slide rule type mechanical computer for readily determining the size of a predetermined number of measurements within a prescribed limit after allowing for the width of certain members also contained within the limit. It is intended primarily for, although not limited to, determining the size of panes of glass to fit within the glass openings where either the opening in the window frame fixed in the wall, or the opening within the movable window framing is known. Allowance can be made for the width of either the framing of the movable window, or the mullions which separate each glass pane. The present invention is therefore adapted to be used to determine the size of window panes, panels or the like which must fit within any prescribed dimension, and in which allowance may or may not have to be made for spacers between the individual panes or panels.

In essence, the invention consists of a slide rule having one or more movable members. One set of scales called minuend scales is provided on which the indicia numerals correspond to the size of the window frame fixed in the wall, or the opening in the movable window framing. Other sets of scales called first or mullion subtrahend scales have indicia numerals corresponding to the width of the intermediate mullions. Another set of scales called second or framing subtrahend scales having numerals corresponding to the width of the framing member may be provided if desired. A final scale called the quotient scale indicates the width of the glass panes or panels that are to be fitted within the prescribed space after appropriate manipulation of the other scales.

Before continuing with the description of the parts of the drawings, the following terms are defined in order to facilitate the description:

Window frame—A structure fixed within a wall opening and having a central opening within which a window may be inserted;
Window—A structure, mounted, usually movably, within the central opening of a window frame, and normally including glass panes fixed within a sash consisting of exterior framing and mullions separating individual panes.
Window framing—The exterior portion of a window sash.
Minuend—A numeral from which another number is subtracted;
Subtrahend—A numeral which is subtracted from another number (or minuend);
Difference—The result of the subtraction of one number (a subtrahend) from another number (a minuend);
Dividend—A number which is to be divided by another number;
Quotient—A number which indicates how many times another number is contained within a first number; in other words, the result of division of a first number by a divisor; a division product.
Remainder—The undivided part of a dividend left after division when only a whole numbered portion of a quotient has been obtained; in mathematical usage the remainder is always less than the divisor, and division of the remainder yields a fractional numeral as a quotient.

center of slide member 15 represents 1 inch on the scale. Rear scale 9 has similar spacing, but is marked in decimal fractions.

The base of the channel carries minuend scales 16, 17, 18, and 19. Minuend scale 16 has equally spaced numeral indicia on it. A distance of 1½ inches on scale 16 represents 1 inch. This is ⅓ of the spacing of quotient scale 8 or 9 on which a distance of 4½ inches represents 1 inch. Minuend scale 16 is intended to be used with divisor 3. Minuend scale 17 has a spacing ¼ that of the quotient scale, and is intended to be used with divisor 4. Scales 18 and 19 are intended for use with divisors 5 and 6, respectively, and have spacings ⅕ and ⅙ that of quotient scales 8 and 9.

On the upper surfaces of side members 11 and 12 are four mullion capacity substracting indicators or subtrahend scales 20, 21, 22 and 23. Each is so calibrated as to be used with divisors 3, 4, 5 and 6, respectively. Scale 20 is located above minuend scale 16. Its origin is offset from the origin of scale 16 by an amount which is equal to the spacing 7 between the origin of quotient scale 8 or 9 and the end of slide member 15 for a purpose which will hereafter be apparent. The spacing of scale 20 is twice that of scale 16. One and one-half inches on scale 20 represents ½ inch, whereas the same distance on scale 16 represents 1 inch.

Subtrahend scales 21, 22 and 23 are similarly associated with minuend scales 17, 18 and 19 respectively. The relationship of the respective minuend and subtrahend scales is as follows:

| Divisor | 3 | 4 | 5 | 6 |
|---|---|---|---|---|
| Minuend Scale | 16 | 17 | 18 | 19. |
| Subtrahend Scale | 20 | 21 | 22 | 23. |
| Minuend Scale. Spacing relative to Quotient Scale. | ⅓ | ¼ | ⅕ | ⅙. |
| Subtrahend Scale. Spacing relative to Associated Minuend Scale. | 3−1, or 2 | 4−1, or 3 | 5−1, or 4 | 6−1, or 5. |

Adjusted remainder—In this specification and in the claims this term is used to indicate the undivided part of a dividend left after a division operation in which a whole numbered portion of a quotient has been obtained; this adjusted remainder may be greater than the divisor if needed to allow for the subtraction of subtrahends corresponding to total window frame or mullion width; accordingly after this subtraction the difference will be a positive number which can be divided to yield a quotient which will be either a fraction less or greater than one, and might possibly be a small whole number.
Divisor—A number which is divided into another number.

FIGURES 1–7 EMBODIMENT

With continued reference to the drawing, one type of slide rule according to the present invention comprises a main body 10 having spaced side portions 11 and 12 forming a channel, the said side portions having opposing facing grooves 13 and 14. Slidably disposed on body 10 between the side members 11 and 12 is a slide member 15 received in the channel and having tongues 15′ and 15″ slidable along the grooves 13 and 14. Body 10 and slide member 15 may be produced of plastic or other desired material by extrusion, or by any other desired manner, and can have single or multiple parts.

Slide member 15 carries a quotient scale 8 on the front side 25 of which numeral indicia are equally spaced. It carries a similar scale 9 on its rear surface 29. Scale 8 is marked with fractional symbols 1/16, ⅛, etc., the 32nds and 64ths being enumerated. A distance of 4½ inches from line 26 to line 27 slightly beyond the longitudinal It will be observed that the minuend scale for a given divisor is $1/n$ of the spacing of the quotient scale where "$n$" is the divisor. The associated subtrahend scale has a spacing $(n-1)$ that of the associated minuend scale. This reflects the fact that there is always one less mullion than the number of window panes. Thus with three panes there are two intermediate mullions, and the width of two mullions must be considered in determining glass size.

The large spacing of quotient scales 8 and 9 permits the markings and the fractional figures to be enlarged sufficiently to be quickly and accurately read without the use of magnification customarily required on most finely printed rulers. It further makes less critical the relative positioning of the various scales, a 1/32 inch error in positioning, for example, would result in an error of less than 1/128 of an inch in the window pane dimension shown on a quotient scale. Beyond the line 27 from the line 26 are indicia indicating the fractions greater than one inch, at the extreme end of which is a rough surface strip 28 to facilitate reciprocation of the slide 15 on the body 10 between the upright members 11 and 12. At the extreme end is a rough gripping surface 30 on the opposite face in the opposite end from surface 28.

The bottom surface of the body 10 carries a division chart 24. Division chart 24, which is illustrated in FIG. 3, shows the quotients obtained by division of each number between 20 and 120 by divisors 3, 4, 5 and 6. The quotient is set out in whole numbers plus an adjusted remainder. In some cases the adjusted remainder is greater than the divisor. This allows for the subtraction of total mullion widths which are larger than a true remainder. For example, referring to FIG. 3, it will be noted that the quotient of 20 divided by 6 is shown as the whole number 2 plus the adjusted remainder 8. If this quotient were shown as the whole number 3 plus the true remainder 2, and there were 5 mullions of ½″ each placed between the 6 window panes, the total mullion width of 2½ would exceed the true remainder 32, and division of remainder would not be practical. Accordingly, setting out the quotient as the whole number 2 plus a remainder of 8 permits subtraction of the 2½″ mullion width from the numeral 8 before division.

Minuend scales 16, 17, 18 and 19 and subtrahend scales 20, 21, 22 and 23 are mathematically calculated so that when the end of slide member 15 is placed on the numeral shown on the minuend scale and the quotient scale or slide member 15 is read opposite the associated subtrahend scale, the proper quotient is obtained. The slide automatically subtracts the total mullion width from the window framing opening size and divides the difference by the number of glass panes to give glass pane dimension. Minuend scales 16, 17, 18 and 19 are spaced to read in terms of the adjusted remainder obtained from the division chart. While they could, if desired, be spaced to read in terms of the total window framing opening, calibrating them to read in terms of this adjusted remainder expands the scale and permits readings to be made with far greater accuracy.

If a window framing opening includes a fraction as well as a whole number, it is only necessary to add this fraction to the adjusted remainder obtained from division chart 24 and to set this adjusted remainder plus the fraction on the proper minuend scale before the division operation.

The use of this embodiment of the invention may be illustrated by a typical example. Assuming that the overall glass opening in a window frame is 69″, and it is desired to place four panes of glass within this 69″, with mullions of 7⁄16 inch thickness between each glass pane. Window pane width in inches and fractions is desired. The following is a step-by-step procedure to obtain the solution of this problem:

Step 1: Referring to the division chart of FIG. 3 and locating 69 in the size column, then directly opposite to the right of 69 in the column headed 4 there is the quotient 16⁄5. This means the desired pane width is 16 full inches plus a quantity obtained by subtracting the mullion width from the adjusted remainder 5 and dividing the difference.

Step 2: Adjust the end of the slide 15 of FIG. 7 which serves as an alignment marker to the 5-inch mark on the ruler 17 and the scale designated 4 divisions, and since the mullion size in the problem is 7⁄16, the result can be read on the slide member 15 opposite the 7⁄16 mark on the mullion capacity indicator 21, which is 59⁄64 of an inch. The answer to the problem is 16 inches obtained earlier as partial measurement, plus the fraction 59⁄64, or a total of 16 59⁄64.

Assuming that the measurement to be divided is 69¼ inches instead of 69 inches, all that is required is to add ¼ inch to the 5 and set the end of the slide 15 to 5¼ inches on the ruler 17 which gives the result of 63⁄64 inch. Therefore the glass size would be 16 63⁄64 inches.

Further if the measurement desired to be divided is 69⅞ inches instead of 69, again it is necessary to add the ⅞ inch to the 5 and set the slide 15 to 5⅞ inches so that the end 31 will be on the ruler 17, which will give the result of 1 9⁄64 inches. Therefore the result is the 16 as the partial glass measurement plus the 1 9⁄64 inches, or a total of 17 9⁄64 inches.

Further this computer will divide also a quotient r number within its predetermined range without subtracting mullion capacity, by merely reading the result in the "0" point located at the beginning of each mullion capacity subtraction indicator.

An important feature of the invention is the enlarged representation of a smaller dimension, namely the inch—and the provision of a slide rule with certain scales or measurements on the body of the ruler and others on the side.

FIGURES 8–17 EMBODIMENT

A fixed member 110 contains spaced upright side portions 111 and 112 defining a channel 113 therebetween having a lower surface 114. The side members 111 and 112 have tongues 115 and 115′ and 116 and 116′ on the sides which face the channel. A lower slide member 17 is slidably mounted for movement within the lower half of channel 113. Tongues 116 and 116′ fit within grooves 118 and 118′ in the side of lower slide 117 to retain it in the channel. An upper slide 119 having tongue receiving grooves 120 and 120′ is similarly mounted in the upper half of channel 113. A stop member 121 is pivoted to one end of side member 111 for movement from the position illustrated in FIG. 14 to a vertical position so that slides 117 and 119 can freely move past it. Slide members 117 and 119 are made of clear plastic and have alignment markers 123, 124 and 125 thereon. The upper surface is covered with a nontransparent material in areas 126 and 127 respectively. These non-transparent areas cover the greatest area of the slide member so that only a relatively small window portion 128 on upper slide member 119 and window portions 129 and 130 on lower slide member 117 remain transparent. Hair line indicators 123, 124 and 125 are located on the lower surface of windows 128, 129 and 130 respectively.

Non-transparent portion of 126 of upper slide 119 carries a quotient scale 135 designed to be used with divisors 2, 3 and 4 and a quotient scale 136 designed to be used with divisors 5 and 6.

Non-transparent portion 127 of lower slide 117 carries minuend scales, 141, 142, 143, 144, 145, to be used with divisors 2, 3, 4, 5 and 6 respectively.

The lower surface 114 of channel 113, carries a set of framing subtrahend scales 152 and 152′, 153, 153′, 154 and 154′, 155 and 155′, and 156 and 156′, each pair being designed for use with divisors 2, 3, 4, 5 and 6 respectively. These scales are designed to be used with given total widths of framing for a window. The scales on the right hand are marked by primed numerals and are designed for use when the total framing width is 3″ or more. Those on the left end are designated by unprimed numerals and called retrocession subtrahend scales for a reason explained in the description of the use of the scale, Example 2, and are designed for use when the total framing width is less than 3″. By total framing width is meant the total of the widths of the framing member at each end of the window. Thus a window might have an upper framing width of 2″ and a lower framing width of 3″; the total frame width would be 5″ and this would be the numeral read on the corresponding subtrahend scale. The right-hand scales start at 3″ because it is conventional in the American millwork industry to have total wooden window framing widths of at least 3″ and a more convenient scale layout can be made by taking advantage of this fact. The left-hand set of scales for framing widths of less than 3″ will normally be used with metal or other windows having small frame width.

On the upper surface of side portions 111 are found a set of mullion width subtrahend scales 162, 163, and 164 designed to be used with divisors 2, 3 and 4 respectively. The upper surface of lower side portion 112 has mullion width subtrahend scales 165 and 166 designed to be used with divisors 5 and 6 respectively.

The reverse side of fixed member 110 contains two division charts 170 and 171. Both set out the quotients obtained by dividing numerals between 16 and 120 by divisors 2, 3, 4, 5, or 6 in whole numbers plus adjusted remainders. Division chart 170 is designed to be used when the number of panes to be placed within a given glass opening in the framing of a window is to be computed. This chart is computed on the assumption that mullion width alone is to be considered. Framing width is not considered.

Division chart 171, on the other hand, is to be used when the number of panes of glass to be placed within a window designed to fit within a given window opening is to be computed. This chart is computed on the assumption that both window framing width and mullion width must be considered. This type of chart finds its greatest utility when windows are to be built to fit a given window opening. Chart 170, on the other hand, finds its greatest utility when panes are to be placed within a window framing having an opening of known dimensions. The quantity 3 is subtracted from each adjusted remainder shown on chart 171 since 3 inches is the standard minimum total frame width used in American millwork practice. Thus for divisor 2 and a window frame opening 16 chart 171 shows whole number 4 and adjusted remainder 5 instead of 8. This compensates for the use of 3″ as the origin of the right-hand total framing width subtrahend scales.

The reverse side of upper slide member 119 contains a pair of quotient product scales 173 and 174 each of which are comparable to quotient scales 135 and 136 except that they are calibrated in decimal fractions rather than ordinary fractions expressed in increments of 1/64.

The minuend, mullion subtrahend, and frame subtrahend scales have their indicia spacing related as follows:

slide member 117 moved to the right as far as possible so that its right end abuts against the stop, set hairline 123 of upper slide 119 above the numeral "4" on scale 143 which corresponds to 4 divisions.

Step 3: Below ½ on scale 164 (which corresponds to 4 division) read ⅝.

Step 4: The total pane width is now the whole number 4 plus the fraction ⅝″ or 4⅝″.

Step 5: Compute the pane length in the same fashion.

*Example 2*

FIG. 16 illustrates the computation of window pane widths when a window is to be designed to fit within a window opening of a given width with window framing under 3″:

| | |
|---|---|
| Total framing width, inches | 2 |
| Mullion width, inch | ¼ |
| Total window opening width, inches | 25 |
| Number of panes of glass | 3 |

Step 1: Consult division chart 171. Opposite 25 in the size column and under division 3, read 5/7. This means the width of the pane will be 5″ plus a quantity obtained by subtracting the framing width and the mullion width from the adjusted remainder 7 and by dividing the difference.

Step 2: Turn up stop member 121 and move lower slide

| Divisor | 2 | 3 | 4 | 5 | 6 |
|---|---|---|---|---|---|
| Minuend Scale | 141 | 142 | 143 | 144 | 145 |
| Framing Subtrahend Scales | 152<br>152′ | 153<br>153′ | 154<br>154′ | 155<br>155′ | 156<br>156′ |
| Mullion Subtrahend Scale | 162 | 163 | 164 | 165 | 166 |
| Minuend Scale Spacing relative to Quotient Scale | ½ | ⅓ | ¼ | ⅕ | ⅙ |
| Mullion Sub. Scale Spacing relative to Min. Scale | Same | 2 | 3 | 4 | 5 |
| Frame Sub. Scale Spacing relative to Min. Scale | Same | Same | Same | Same | Same |

When minuend scale slide 117 is positioned with its right end against stop 121 the origin of minuend scale 141 is offset to the right of the origin of its associated subtrahend scale by a distance 148. Distance 148 is the spacing between alignment marker 125 and the origin of scale 141. The origin of each other mullion subtrahend scale is similarly offset from the position of the origin of the associated minuend scale when minuend scale slide 117 abuts stop 121. Distance 148 is equal in magnitude to the distance 149 between quotient scale alignment marker 123 and the origin of the quotient scales 135 and 136. The offset of the quotient scale alignment marker 123 from the quotient scale origin makes reading and positioning of the scales more convenient; however, it makes necessary a corresponding offset of the origins of associated minuend and subtrahend scales.

The use of this embodiment of the invention may be illustrated by the following examples.

*Example 1*

FIGURE 15 illustrates the computation of the widths of window panes needed to fit within the framing opening in a window under the following conditions:

| | |
|---|---|
| Framing opening width, inches | 20 |
| Mullion width, inch | ½ |
| Number of panes | 4 |

Step 1: Referring to the division chart 170 opposite 20 and under 4 read 4/4. This means that the width is 4″ plus a quantity obtained by subtracting the mullion width from the adjusted remainder numeral 4 and by dividing the difference.

Step 2: With stop 121 in blocking position and lower member 117 so that hairline indicator 125 overlies numeral 2 (the framing width) on retrocession subtrahend scale 153 which corresponds to 3 divisions retrocession subtrahend scale 153, so called because it puts back into the instrument the difference between the standard minimum frame width of 3″ (removed by chart 171) and an actual total frame width of less than 3″ that is to be subtracted. In contrast subtrahend scale 153′ adds into the instrument the amount by which subtrahend frame widths which exceed 3″.

Step 3: Without moving lower slide member 117 move upper slide member 119 so that hairline 123 overlies the numeral 7 (the adjusted remainder obtained from division chart 171) on scale 142 which also corresponds to 3 divisions.

Step 4: Beneath the numeral "¼" (the mullion width) of scale 163 (which also corresponds to 3 divisions) read 2½.

Step 5: Add 5 and 2½. The total, 7½, is the desired pane width.

Step 6: Compute window pane length in the same fashion if only one sash, as for example, if a hinged window, occupying the window opening length.

Step 6: (Alternate for double hung windows): As indicated by legend 180 on side portion 111 heights of glass panes for double hung windows must be computed in a different fashion since framing portions of the upper and the lower sash overlap each other. The total width of all intermediate rails, by which is meant both the framing width and the mullion or bar widths must be subtracted from the total window opening. The quotient scale on slide 119 will then be read opposite numeral zero of the appropriate mullion scale. For example, assume that four window panes are to be placed within a window opening, the window sashes having the following dimensions:

| | Add, inches |
|---|---|
| Upper sash: | |
| Upper framing, ¾ inch | ¾ |
| Mullion (bar), ¼ inch | ¼ |
| Lower framing, ¾ inch [1] | ¾ |
| Lower sash: | |
| Upper framing, ¾ inch [1] | ¾ |
| Mullion (bar), ¼ inch | ¼ |
| Lower framing, ¾ inch | ¾ |
| Total rail and bar dimensions | 2¾ |

[1] Overlap.

Computation of pane size is made by entering the 2¾ (the total rail and bar measurements) on the framing subtrahend scale 154 and obtaining from the division chart 171, the whole number and the adjusted remainder for the desired double hung window opening heights listed under column marked "4 divisions" and entering the adjusted remainder on the minuend scale slide 117 and reading the quotient scale opposite "0" for the appropriate mullion subtrahend scale.

*Example 3*

FIG. 17 illustrates the computation of window pane widths when a window is to be designed to fit within a window opening of a given width (with window framing 3″ or more):

| | |
|---|---|
| Total framing width, inches | 4¼ |
| Mullion width, inch | ½ |
| Total window opening width, inches | 65 |
| Number of panes of glass | 4 |

Step 1: Consult division chart 171. Opposite 65 in the size column and under division 4, read 13/10. This means the width of the pane will be 13″ plus a quantity obtained by subtracting the framing width and the mullion width from the adjusted remainder 10 and by dividing the difference.

Step 2: With the stop member number 121 in either locked or open position move the lower slide member 117 so that hairline indicator 124 overlies numeral 4¼ (the framing width) on scale 154′ which corresponds to 4 divisions.

Step 3: Without moving lower slide member 117 move upper slide member 119 so that hairline indicator 123 overlies the numeral 10 (the adjusted remainder obtained from division chart 171) on scale 143 which also corresponds to 4 divisions).

Step 4: Beneath the numeral ½″ (the mullion width) of scale 164 (which also corresponds to 4 divisions) read 1 13/16.

Step 5: Add 13 and 1 13/16. The total 14 13/16 inches is the desired pane width.

Step 6: Compute window pane length in the same fashion for all single windows. However for double hung window opening *heights* only, follow note 180 appearing on member 111 FIG. 8, which states "For double hung window opening *heights* only, subtract all rails (window framing) including bars and read the quotient scale opposite "0" of the mullion scale.

GENERAL PRINCIPLES

Now that two embodiments of the device have been described, it is possible to describe the general principles upon which the scales are laid out relative to each other in order that applicant's generic invention may be appreciated.

In each case the minuend scale intended to be used with a particular divisor has its indicia so spaced that the length indicating a given unit on the minuend scale is a fraction of the length indicating the same spacing on the quotient scale. For two divisions, for example, the minuend scale has a spacing one-half that of the spacing of that unit on the quotient scale; for three divisions the spacing is one-third and so on. The quotient scale spacing is accordingly $n$ times the minuend scale spacing where $n$ equals the divisor intended to be used.

The subtrahend scales have spacings which are some multiple of the associated minuend scale. The multiple depends upon the number of mullions which will be found in the window for which computation will be made. For example, if there is to be only one mullion, as when two panes of glass are placed within the framing of a window, the subtrahend scale spacing is equal to that of the minuend scale spacing. If there are two mullions in the window, that is when three panes of glass are to be placed within the framing of a window, the spacing is twice that of the minuend scale. In each case there is one mullion less than the number of glass panes. Since the divisor is always equal to the number of glass panes to be placed therein, the subtrahend spacing is always $(n-1)$ times the minuend scale spacing.

The minuend scale is always precisely positioned relative to the subtrahend scale before the division operation takes place. In the FIGS. 1–7 embodiment the precise positioning is a natural consequence of the location of the minuend and mullion subtrahend scales on the same fixed member. In the FIGS. 8–17 embodiment the minuend and the mullion subtrahend scales are on different members which must be precisely positioned relative to each other before the division step. If framing width is not to be considered, the minuend scale is fixed in a precise position by (1) turning down stop member 121 to the blocking position and (2) moving minuend slide member 117 into abutment with stop member. If the window framing width must be considered the member 117 carrying the minuend scale is precisely positioned relative to fixed member 110 which carries the mullion subtrahend scales before the division operation by positioning alignment marker 124 or 125 over a desired framing width numeral on one of the framing subtrahend scales.

This precise positioning of the minuend scale relative to an associated mullion subtrahend scale permits the subtraction and division operation to take place in one step. The quotient scale alignment indicator (alignment marker 123, FIGS. 8–16 embodiment, end of slide 15 in FIGS. 1–7 embodiment) is aligned with the desired minuend number. The quotient scale is then read adjacent the given mullion width on the associated subtrahend scale. Positioning the quotient scale alignment marker at a desired number on the minuend scale and then reading the quotient scale adjacent an origin point would measure a length on the quotient scale which is equal to the minuend length. The numeral shown on the quotient scale at the end of this length is the quotient obtained by division of the number shown on the minuend scale by this divisor. This is because the quotient scale spacing is a multiple of the minuend scale spacing equal to the divisor. However, if the quotient scale is read adjacent a numeral shown on the subtrahend scale, rather than at the origin, a certain length is subtracted from the number that would otherwise be shown on the quotient scale. This accomplishes the subtraction operation. Because of the precise positioning of subtrahend scale relative to minuend scale, and because of the quotient scale spacing being a multiple of the minuend scale spacing, the subtraction and the division operation are carried out in one step.

It will be readily apparent that a simple and efficient slide rule has been provided for dividing the difference between a minuend and one or more subtrahends particularly useful for computing window pane sizes. In the first embodiment glass pane sizes can be computed by dividing the difference between a minuend corresponding to the dimensions of the opening within the framing of a window and a subtrahend corresponding to the total width of one or more mullions. In the second embodiment of the invention, this computation of glass pane sizes can be made by dividing the difference between the dimension of a window opening and the total width of window framing and the mullions. In either embodiment the pane widths can be read to a very high degree of accuracy and accordingly glass wastage, etc. caused by inaccuracies in computation is avoided.

It will be obvious to those skilled in the art that various changes may be made in the invention without departing from the spirit and scope thereof, and therefore the invention is not limited by that which is illustrated in the drawings and described in the specification, but only as indicated in the accompanying claims.

What is claimed is:

1. A slide rule for dividing the difference between a minuend and a subtrahend scale comprising a number of members mounted for movement relative to each other including:

A. A quotient scale member having successive numerical indicia equally spaced.

B. A plurality of minuend scales on a member movable relative to the quotient scale member, (1) each minuend scale intended to be used with a different divisor *n*, (2) a given distance on any particular minuend scale indicating a quantity which is a multiple *n* of the quantity indicated by the same distance on the quotient scale, (3) having their numerical indicia increasing from the origin in a direction opposite the quotient scale direction, C. A plurality of subtrahend scales on a member movable relative to the quotient scale, each having, (1) a spacing ($n-1$) times the spacing of the minuend scale used with the same divisor *n*, (2) their numerical indicia increasing from the origin in the same direction as on the minuend scale, D. A chart showing quotients of particular numbers by particular divisors in whole numbers plus adjusted remainder quantities carried by one of said members.

E. Means for positioning the minuend and the subtrahend scales relative to each other such that the distance between a number on the minuend and a number on the subtrahend scale is equal to the distance on the minuend scale that would indicate a quantity equal to the difference between the minuend number and ($n-1$) times the associated subtrahend number.

2. The structure of claim 1 in which the number of members is two, and the means for precisely positioning associated minuend and subtrahend scales relative to each other is a single one of the members which carries the minuend and the associated subtrahend scales.

3. The structure of claim 1 in which the number of members is three and in which the minuend scale is on one of the members, the subtrahend scale is on a different member, and the means for precisely positioning associated minuend and subtrahend scales relative to each other is a marker for indicating a position of the said members relative to each other.

4. The structure of claim 1 in which the quotient scale is on a first member, the minuend scales are on a second member, the subtrahend scales are on a third member, and the means for precisely positioning the minuend scale relative to the subtrahend scale are alignment means on said second and third members carrying a second set of subtrahend scales, each having, A. A numeral spacing equal to the spacing of an associated minuend scale intended for use with the same divisor, B. Each having numerals located relative to an alignment marker for positioning the second member relative to the third member at a distance corresponding to the value of a second subtrahend number to be subtracted from the minuend before the division operation.

5. A slide rule for dividing the difference between a minuend and a plurality of subtrahends comprising three relatively movable members having, A. A quotient scale on an elongated slide member having, (1) one-half of a tongue and groove engaging means, (2) numerical indicia marked in 64ths of an inch, (3) successive numerical indicia equally spaced, (4) a similar quotient scale on the reverse side of said number identically spaced and located but marked in decimal fractions, B. A second minuend scale member having, (1) one-half of a cooperating tongue and groove engaging means, (2) a plurality of minuend scales, each associated with some particular divisor *n*, (3) each minuend scale having spacing such that an equal distance from any given point equals a quantity which is *n* times the quantity shown by the same distance on the quotient scale, C. An elongated fixed member having, (1) two upstanding side members extending along the entire length of the fixed member and defining a channel therebetween, (2) the inner sides of said side members carrying the cooperating halves of the tongue and groove mechanisms for engaging the quotient slide member and the minuend slide member, (3) a stop member pivoted to the right-hand end of the fixed member for movement from a position where it limits the movement of the minuend slide member past the end of the channel to a position where it does not block said movement, (4) a number of first subtrahend scales on the top of the side members, each associated with some particular divisor *n*, each having a spacing ($n-1$) times the spacing of the minuend scale associated with the same divisor, each having an origin at its left-hand end so located that when the minuend slide member is positioned against the stop, the distance between a given number on a minuend scale and a number on the associated subtrahend scale being equal to the quantity that would be shown on that minuend scale for the difference between the minuend number and ($n-1$) times the subtrahend number, (5) two division charts located on the back of the fixed member, each showing quotients for a number of dividends and a number of divisors, A. The first chart showing the quotients in whole numbers plus adjusted remainders, B. The second chart showing the quotients in whole numbers and adjusted remainders less a fixed quantity, C. A plurality of second subtrahend scales marked on the bottom surface of said channel, (1) each associated with some particular divisor *n* and having numerical indicia having the same spacing as the associated minuend scale, (2) each having a righthand portion and a lefthand portion, (3) the righthand portion having the said fixed quantity at the righthand end of the scale and numerals running upwardly from that numeral to the left, (4) the lefthand portion of the scale being located at the left-hand end of the channel and having numeral quantities running from a numeral corresponding to the said fixed quantity to the lefthand end downwardly to the right.

6. A slide rule for dividing the difference between a minuend and a plurality of subtrahends comprising three relatively movable members including A. a first member carrying a quotient scale having succeeding numbers equally spaced, B. A minuend scale member carrying a scale having succeeding numbers spaced at distances which are multiples of the spacing of the quotient scale.

C. A subtrahend scale member carrying a first subtrahend scale having succeeding numbers spaced at distances that are multiples of the minuend scale spacing, D. Means to position the minuend scale member relative to the subtrahend scale member at a precise position where the distance between a given numeral indicia on the minuend scale and a given numeral on the subtrahend scale is the same as the distance corresponding to the difference between the said numbers on the minuend scale, and E. A second subtrahend scale carried by one of the second or third members having numerals positioned at a distance relative to the said precise position corresponding to the value of said numeral, whereby the relative position of said second and third members can be offset from the precise position a distance corresponding to the said numeral quantity on the minuend scale.

7. The structure of claim 6 in which there are a plurality of minuend scales on the second member and a plurality of each type of subtrahend scales on the third member, one of each type of scale being associated with a given divisor.

8. The structure of claim 6 in which the scale numerals are spaced so that a given distance on the minuend scale represents a quantity equal to $n$ times the quantity indicated on the quotient scale for the same distance, and a given distance on the first subtrahend scale represents a quantity which is $1/(n-1)$ times the quantity represented by the same distance on the minuend scale where $n$ is a particular divisor with which the minuend and the subtrahend scales are intended to be used.

9. The structure of claim 8 in which the said second subtrahend scale has indicia spacing identical to that of the minuend scale.

10. A slide rule for dividing the difference between a minuend and a subtrahend comprising two movable members including:

A. A quotient scale member on which succeeding numerals are equally spaced,

B. A fixed member having, (1) a number of minuend scales, having succeeding numerals increasing in a direction opposite to the quotient scale numerals and spaced so that a given distance on a particular minuend scale represents a quantity equal to $n$ times the quantity indicated by the same distance on the quotient scale numerals where $n$ is a particular divisor with which the particular minuend scale is intended to be used, (2) a number of subtrahend scales, each having succeeding numerals increasing in the same direction as the minuend scale numerals and having a spacing wherein a given distance represents a quantity equal to $(n-1)$ times the quantity represented by the same distance on an associated minuend scale used with the same divisor $n$, and (3) the origin of each subtrahend scale being offset from the origin of the associated minuend scale by a distance equal to the distance between the quotient scale origin and the nearest end of the quotient scale member, C. A chart showing quotients of particular numbers by particular divisors in whole numbers plus adjusted remainder quantities carried by one of said members.

11. A slide rule for the computation of the sizes of an integral number $n$ of window panes designed to fit within openings of a given size with intermediate mullions between the panes comprising (a) a member having a quotient scale thereon with an alignment marker and equally spaced numerical indicia;

(b) a second member having a minuend scale thereon with equally spaced indicia, given quantities on the minuend scale being indicated by a distance which is $1/n$ of the distance indicating the same quantity on the quotient scale;

(c) a member having a subtrahend scale thereon with equally spaced numerical indicia, given quantities on the subtrahend scale being indicated by a distance which is $(n-1)$ times the distance indicating the same quantity on the minuend scale;

(d) means positioning the minuend scale and the subtrahend scale relative to each other so that distances on the minuend scale correspond to the mathematical difference between the minuend scale number and $(n-1)$ times the subtrahend scale number;

(e) means for aligning the quotient scale relative to the minuend scale so that the minuend scale distance corresponding to the said mathematical difference can be read in the units of the quotient scale to give a quotient quantity representing $1/n$ of the difference between the minuend number and $(n-1)$ times a subtrahend number; and (f) a chart showing quotients of particular numbers by particular divisors in whole numbers plus adjusted remainder quantities.

References Cited by the Examiner

UNITED STATES PATENTS

| | | | |
|---|---|---|---|
| 1,461,677 | 7/1923 | Reynolds | 235—70 |
| 1,568,475 | 1/1926 | Schwanda | 235—70 |
| 2,323,475 | 7/1943 | Lang | 235—69 |
| 2,434,306 | 1/1948 | Wood | 235—70 |
| 2,514,326 | 7/1950 | Giles | 235—70 |
| 2,793,808 | 4/1957 | Zak | 235—70 |
| 2,863,605 | 12/1958 | Pickett | 235—70 |

RICHARD B. WILKINSON, *Primary Examiner.*

LOUIS J. CAPOZI, *Examiner.*

J. G. MURRAY, *Assistant Examiner.*